United States Patent [19]

Patitsas et al.

[11] Patent Number: 5,149,591
[45] Date of Patent: Sep. 22, 1992

[54] BLENDS OF POLYVINYL ALCOHOL AND POLYURETHANE WATER DISPERSIONS FOR INCREASED HUMIDITY RESISTANCE OF WATER SOLUBLE WHITE SIDEWALL PAINTS

[75] Inventors: George P. Patitsas, Kent; Bharat K. Kansupada, Mogadore, both of Ohio

[73] Assignee: The Goodyear Tire & Rubber Company, Akron, Ohio

[21] Appl. No.: 676,495

[22] Filed: Mar. 28, 1991

[51] Int. Cl.$^5$ .................. B32B 27/00; B32B 27/40; B32B 25/04; C08J 3/02

[52] U.S. Cl. .................. 428/423.1; 428/423.9; 428/424.2; 428/424.7; 428/492; 428/521; 524/501; 524/503; 524/507

[58] Field of Search ............... 428/423.1, 423.9, 424.2, 428/424.7, 492, 521; 524/501, 503, 507

[56] References Cited

U.S. PATENT DOCUMENTS

| | | |
|---|---|---|
| 3,806,486 | 4/1974 | Endriss et al. ............... 428/423.9 |
| 4,208,311 | 6/1980 | Kinoshita et al. ............ 524/369 |
| 4,287,039 | 9/1981 | Buethe et al. ................ 522/86 |
| 4,388,375 | 6/1983 | Hopper et al. ............... 428/483 |
| 4,636,546 | 1/1987 | Chao ............................ 525/123 |
| 4,857,565 | 8/1989 | Henning et al. .............. 523/343 |
| 4,911,218 | 3/1990 | Patitsas ....................... 152/525 |
| 4,925,885 | 5/1990 | Rosthauser et al. .......... 523/415 |

FOREIGN PATENT DOCUMENTS 61-079646A  4/1986  Japan ................ 428/424.2

Primary Examiner—Paul R. Michl
Assistant Examiner—Patrick Niland
Attorney, Agent, or Firm—Henry C. Young

[57] ABSTRACT

A rubber laminate comprising a rubber substrate having coated thereon a blend of a water dispersible insoluble polyurethane and a water soluble polyvinyl alcohol. The combination of water soluble and water insoluble polymers upon drying result in a film that is humidity resistant, and has good abrasion resistance but can be removed by high-pressure washing or scrubbing.

11 Claims, No Drawings

BLENDS OF POLYVINYL ALCOHOL AND POLYURETHANE WATER DISPERSIONS FOR INCREASED HUMIDITY RESISTANCE OF WATER SOLUBLE WHITE SIDEWALL PAINTS

FIELD OF THE INVENTION

The present invention relates to a humidity resistant rubber laminate coating comprising a water insoluble dispersible polyurethane and a water soluble polyvinyl alcohol. The composition is a blend of water soluble and water insoluble polymers which, upon drying, is humidity resistant, but can be removed by high-pressure washing or scrubbing. More particularly, it relates to a protective coating composition for a rubber tire, and specifically the white sidewall portion thereof, that imparts good abrasion resistance, good humidity resistance, and yet it can be removed with water under pressure.

BACKGROUND

Tire sidewalls are often coated with a protective paint layer, particularly tire sidewalls that have a coloring other than that of the typical black tire. Generally, these sidewalls have a white coloring. White sidewall tire protective paints should have good stain and humidity resistance in order to protect the white sidewall during storage and transportation before application to a vehicle.

The carbon black reinforcement in rubber tires, typically imparts a black color to the tire. In order to produce a different color on a part of the tire, the carbon black is generally replaced with another pigmenting agent. For example, the white sidewalls of a tire contain $TiO_2$ and no carbon black. Other compounding agents used in rubber formulations, such as amine based compounds, can stain or discolor the white sidewall area. Moreover, during storage, anti-ozonants, antioxidants, and oils from the treads of black sidewalls of adjacent tires, often migrate and stain the white sidewall. This becomes a particular problem in high humidity conditions.

Also, under relatively high humidity conditions, conventional coatings, such as polyvinyl alcohol (PVA), or other coatings known to the art and to the literature, can soften. This softening allows the coating to scuff easily, and abrade away and can occur by the tire merely rubbing against another tire, thus leaving the side-wall unprotected.

Rosthauser U.S. Pat. No. 4,925,885 discloses aqueous compositions for use in the production of crosslinked polyurethanes.

Patitsas U.S. Pat. No. 4,911,218 relates to a composition comprised of polyvinyl alcohol coating and at least one water insoluble particulate organic or inorganic material having a plate like structure for use on at least one side of a rubber tire.

Henning U.S. Pat. No. 4,857,565 discloses a process for the continuous production of aqueous polyurethane dispersions and their use as a coating composition or as an adhesive.

Buethe U.S. Pat. No. 4,287,039 discloses an aqueous radiation-curable binder composition containing a water-dispersible prepolymer containing polymerizable carbon-carbon double bonds, and a dispersion aid.

Kinoshita et al. U.S. Pat. No. 4,208,311 discloses an aqueous urethane diamine dispersions forming coating compositions with aqueous diepoxide dispersions, containing polyoxyethylene aryl- or lauryl ether emulsifiers.

Japanese Patent 58132051 discloses a thermosetting urethane emulsion paint, particularly for coating non-flat surfaces comprising a) thermosetting urethane emulsion paint; b) a boiling point organic solvent; and optionally c) an aromatic organic solvent co-boiling with water; and/or d) a viscosifier.

Japanese Patent 53126047 discloses a method comprising adding powders to aqueous resin emulsions, mixing them and forming many bubbles in the mixtures, and coating base materials with the paints.

European Patent 307775, to Kruse, discloses a water-dispersible modified polyurethane thickener that increases the high shear viscosity of aqueous compositions while providing acceptable flow and levelling characteristics.

EP Patent 7032 discloses a thermosetting aqueous nonionic dispersion for spray-coating that contains a hydroxyl group-containing polymer, a masked polyisocyanate and an auxiliary dispersant. The dispersions are used for lacquering metals, particularly as car lacquers and also coil coatings, and can be sprayed on as primers or filler coatings.

SUMMARY OF THE INVENTION

The present invention relates to a hydrolytic rubber blend comprising a water-dispersible polyurethane and a water soluble PVA. This novel blend of PVA and water dispersed polyurethane when blended at about 2 to 30 parts by weight of polyurethane per 100 parts by weight of PVA offers humidity resistance to a rubber substrate when applied thereto as a dry film coating. The polyurethanes of the current invention are formed from the reaction of an isocyanate and a hydroxyl terminated intermediate. Blocking agents are utilized to prevent further reaction with water.

DETAILED DESCRIPTION OF THE INVENTION

The present invention relates to a hydrolytic rubber laminate comprising a rubber substrate and a coating composition blend comprising a water dispersible insoluble polyurethane polymer and PVA. The blends of the present invention can also contain conventional additives known to the art and the literature typically used in sidewall paints or films.

The polyvinyl alcohol of the present invention, generally has the formula —$CH_2CHOH$—. The polyvinyl alcohol is commercially available and is well known to the art and to the literature. It is a water-soluble synthetic polymer typically made by the alcoholysis of polyvinyl acetate. The polymer decomposes at about 200° C. The weight average molecular weight of the polyvinyl alcohol (PVA) can vary from 22,000 to 250,000 depending on the grade of the polymer. Generally, as the molecular weight decreases, the water solubility increases. The preferred molecular weight range is from about 84,000 to about 110,000.

The water insoluble polyurethanes of the present invention are also commercially available and generally known to the art and the literature. These urethanes are generally formed from the reaction of a polyisocyanate and a hydroxyl terminated intermediate. The intermediate can be a hydroxy terminated polyether, a hydroxy terminated polyester, and the like. If the intermediate is an ether, it can be made from an alkylene oxide with from about 2 to about 5 carbon atoms, or from any combination thereof. If the intermediate is an ester, it can be made from a diol of from about 2 to about 8 carbon atoms and a dicarboxylic acid or an anhydride containing from about 4 to about 12 carbon atoms, which can be aliphatic or aromatic. The preferred intermediate is a hydroxyl terminated polyester. Specific examples of hydroxy-terminated polyesters include any hydroxy-terminated polyester prepared from poly-basic acids or anhydrides as for example, adipic acid and phthalic anhydride and polyols such as propylene glycol. The ether or ester intermediates generally have a molecular weight of from about 700 to about 25,000, and desirably from about 1,200 to about 5,000.

The hydroxy-terminated intermediate is reacted with the polyisocyanate. The polyisocyanates of the present invention are preferably diisocyanates. The polyisocyanate can be aliphatic, aromatic, an aliphatic substituted aromatic and the like having from 4 to about 20 carbon atoms, and preferably from about 6 to about 15 carbon atoms, as well as polymeric derivatives thereof. Specific examples of polyisocyanates include tolylenediisocyanate (TDI), methylene bis-(4-phenyl isocyanate) (MDI), and the like, with MDI being preferred (e.g. Desmodur W manufactured by Mobay Chemical Company). Generally, the equivalent ratio of the polyisocyanate to the intermediate is from about 0.90 to about 1.00, desirably from about 0.95 to about 1.00, and preferably from about 0.98 to 1.00 and thus no excess isocyanate is present. That is, free isooyanate is generally absent in the blend. An excess of isocyanate is highly undesirable since any excess would react with water and produce an undesirable reaction.

Blocking agents are used to react with the terminal isocyanate group, to prevent a reaction with moisture. The blocking agent used can include any conventional blocking agent as well as those known to the art and to the literature. Desirable types of blocking agent include phenolic compounds, various oxine compounds, various ester compounds, and the like. Examples of suitable blocking agents include phenol, 3-methoxyphenol, 4-methoxyphenol, nonylphenol, metacresol, paracresol, 4-chlorophenol, meta-hydroxybenzaldehyde, ortho-hydroxybenzaldehyde, parahydroxybenzaldehyde, hydroquinone, 1-hydroxy-2-proponone, 3-hydroxy acetophenone, 4-hydroxy acetophenone, ethyl acetyl acetate and cyclohexanone oxine. Nonylphenol is generally preferred.

The amount of blocking agent used varies with the type of agent, but is generally an amount sufficient to react with the isocyanate and to block all the terminal isocyanate groups. Thus, the amount of blocking agent is such that generally at least 95 percent, desirably at least 98 percent, and preferably 100 percent of all of the isocyanate groups are blocked.

The polyurethane formed is generally used in an amount of about 2 to about 30 parts by weight per 100 parts by weight of PVA, desirably from about 3 to about 25, and preferably from about 4 to about 20 parts by weight. Generally, this is an effective amount to give humidity resistance without sacrificing water solubility and/or washability. A small particle size is desirable and ranges generally from about 0.1 microns to about 10 microns, and preferably from about 1 micron to about 2 microns. If the particle size is too large, spots or a rough appearance will often occur on the paint coating. A particularly preferred polyurethane is Witcobond W-240 which contains a polyester intermediate having a molecular weight of approximately 1,500, a hydroxyl number of from about 50 to about 60, and is made utilizing MDI commercially available as Desmodur W manufactured by Mobay Chemical Company.

In accordance with the practice of this invention, a solution of polyvinyl alcohol is prepared first. This can be done by any conventional mixing method known to the art and to the literature. A specific method includes dispersing PVA powder in cool water, e.g., about 60° F., and then heating the solution to about 180° F. while under agitation.

After the PVA solution is prepared, various essential additives are mixed therewith. Such essential additives generally include wetting agents, plasticizers, pigmenting agents or colorants such as any conventional blue dye, barrier agents, and optionally other additives, well known to those skilled in the art and the literature. Generally, this is accomplished by adding pigmenting agent (e.g. Blue), then the various wetting agents, then adding the plasticizers, and optionally adding the various barrier agents.

Generally, any wetting agent known to the art and the literature can be used to aid in processing and dispersibility of the insoluble blocked polyurethane. The surface active compound can be anionic, cationic and nonionic, or a mixed surface active agent. Anionic surfactants are preferred. Anionic surfactants include various types of fluoro surfactants such as mixed mono n-(bis) perfluoroalkyl phosphates or ammonium salts thereof having a total of from about 1 to about 20 carbon atoms. A specific example of such a wetting type of wetting agent is Zonyl FSP manufactured by Du Pont. Such a wetting agent can generally be represented by the formula

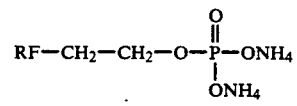

where RF is $(CF_3\text{-}CF_2)_n$
where n=3 to 8
The amount of surfactant is generally about 0.1 to about 3.0, desirably about 0.1 to 1.0, and preferably 0.2 to 0.6 by weight per 100 parts by weight of PVA.

The blend generally includes a suitable plasticizer to make the PVA more flexible. Such materials are well known to those skilled to the art and the literature. Specific examples include glycerine, and/or polyglycerol. The plasticizer should be one that does not substantially degrade the barrier properties of the PVA. However, if desired, the plasticizer can include small amount of polyalkyleneetherglycol. Ethylene glycol is preferred. The amount of plasticizer varies depending on the plasticizer used, but generally is up to about 35 parts by weight, desirably from about 10 to about 35 parts by weight, and preferably about 15 to about 30 parts by weight based upon 100 parts by Weight of the PVA.

Barrier agents which will retard, inhibit, and/or prevent migration of antiozonants, antioxidants, and oils as well as prevent staining can be included in the blend. Generally, a plate-like structured material such as a mica or flaked glass is used. The plate-structured material is of such materials having two substantially parallel opposing plate-like surfaces with an average width to thickness ratio being in the range of about 5/1 to about 30/1. Preferably the mica and/or flaked glass has a particle size in the range of about 1 to about 300 microns, more preferably about 1 to about 50 microns. The amount of barrier agents ranges from about 15 to about 100 parts by weight and desirably from about 30 to about 90 parts by weight per 100 parts by weight of PVA.

In further accordance with this invention, a pneumatic rubber tire is provided having at least a portion thereof comprised of a cured rubber containing a conventional coloring pigment such as titanium dioxide and/or zinc oxide in conventional amounts, e.g., 1 to 100 parts by weight per 100 parts per weight of rubber in the absence of carbon black where the surface of said portion has a coat thereon of the blend composition of this invention.

The preferred substrate is a blackwall tire or white sidewall tire, with the white sidewall tire being the most preferred. The white sidewall portion of the tire is made of conventional rubbers known to the art and the literature. Examples of suitable rubbers include preferably butyl rubber which is, a copolymer of isobutylene with a small amount of isoprene. Commercial butyl rubber grades are generally prepared by copolymerizing small amounts of isoprene, about 1 to about 3 percent of the monomer feed, with isobutylene, and catalyzed by $AlCl_3$ dissolved in methylchloride. Butyl polymers can also include halogenated derivatives of butyl rubber, such as chloro-, bromo-, and other halogens. The grade of butyl rubber can be distinguished by the molecular weight and mole percent unsaturation.

Along with pigmenting agents, various ingredients are conventionally used in the compounding of rubber for the manufacture of rubber articles including tires, which are well known to those having skill in the art and the literature. These processing agents can include various antidegradants, processing oils, fillers such as talc, silicates, and small amounts of clay, curatives, and the like. After the various processing aids and additives are blended, a rubber substrate is formed as in the shape of a narrow strip.

The coating is applied to the cured rubber in any conventional manner as by brushing, spraying, etc., and is generally from 1 to 10 mils thick wet, desirably from 3 to 8, and preferably from 5 to 6 mils wet. The dry coating thickness is generally from 1.0 to 5.0 mils dry, desirably from 1.5 to 4.0, and preferably from 1.5 to 3 mils.

The following examples serve to illustrate the use of the invention, but do not limit it in any way.

HUMIDITY RESISTANCE TEST

A piece of white sidewall tire was sprayed with a white sidewall paint to obtain a coating of about 5-7 wet mils thickness. The coated tire was then subjected to heat at 70° C. in a drying oven for approximately 5-10 minutes, to form a paint film of about 1.5-2 dry mils thickness.

The dried sample was then placed in a humidity chamber for 1 hour. The samples were subjected to two different sets of conditions, 90 percent relative humidity (RH) at 30° C., and 90 percent RH at 70° C.

The samples were removed from the humidity chamber. A passenger tread was hand rubbed using uniform force against the white sidewall. The number of scuffs was recorded. Failure occurred when the film scuffed at 1 to 2 strokes. A film maintaining integrity with 3 or more strokes was recorded as a pass.

STAIN RESISTANCE TEST

White sidewall tires samples were sprayed with about 1.5 mil dry coating of paint formulation. The samples were placed in humid conditions (30° C.) at 90 percent RH, and a piece of rubber tread compound was placed on top of the white sidewall samples under a 2 lb. weight. The samples remained in the oven for about 24 hours.

The samples were removed from the oven, disassembled, and washed to remove the coatings. The clean samples were then placed under an ultraviolet light for about 2 hours.

The samples were visually inspected and tested with a photovolt meter to determine the amount of whiteness.

EXAMPLE 1

A polyvinyl alcohol formulation as in Table I was prepared as follows: PVA was added slowly to cold water with vigorous agitation, so that no lump formation occurred. The water temperature was then increased to about 180° F. while continuously mixing, until the PVA was completely dissolved in the water. The polyglycerol and the glycerine were then added with continuous agitation, followed by the surfactant, the biocide, the blue dye and the defoamer.

TABLE I

| Material | Amount |
|---|---|
| Deionized water | 71.00 g |
| PVA[1] | 12.22 g |
| Polyglycerol[2] | 0.28 g |
| Glycerine[3] | 2.81 g |
| Surfactant[4] | 0.14 g |
| Biocide | 0.10 g |
| Blue dye | 1.00 g |
| Defoamer[5] | 0.20 g |
| Total: | 87.75 g |

[1] A polyvinylalcohol from Air Products Company obtained as Vinol 205.
[2] A polyglycerol from Chemical Components Inc., obtained as RZN.
[3] Glycerin from P & G, Inc.
[4] A fluorosurfactant from DuPont de Nemours & Co. obtained as Zonyl FSP.
[5] From Versa Chemical Co. identified as a paraffinic oil-based material.

EXAMPLE 2

A polyvinyl alcohol coating solution containing mica, Table II, was prepared by following the procedure as in Example 1 with the addition of mica as indicated. The formulation was mixed for 10 minutes after the addition of all the ingredients, to allow the mica particles to be well dispersed.

TABLE II

| Material | Amount |
|---|---|
| Deionized water | 71.00 g |
| PVA[1] | 12.22 g |
| Polyglycerol[2] | 0.28 g |
| Glycerine[3] | 2.81 g |
| Surfactant[4] | 0.14 g |
| Biocide | 0.10 g |
| Blue dye | 1.00 g |
| Defoamer[5] | 0.20 g |
| Mica (328 mesh) | 5.24 g |
| Total: | 92.99 g |

[1] A polyvinylalcohol from Air Products Company obtained as Vinol 205.
[2] A polyglycerol from Chemical Components Inc., obtained as RZN.
[3] Glycerin from P & G, Inc.
[4] A fluorosurfactant from DuPont de Nemours & Co. obtained as Zonyl FSP.
[5] From Versa Chemical Co. identified as a paraffinic oil-based material.

EXAMPLE 3

A polyvinyl alcohol coating solution containing a polyurethane dispersion was prepared by following procedures of Examples 1 and 2. The below formulation, as set forth in Table III, was mixed for 10 minutes after the addition of all of the ingredients.

TABLE III

| Material | Amount |
| --- | --- |
| Deionized water | 71.00 g |
| PVA[1] | 12.22 g |
| Polyglycerol[2] | 0.28 g |
| Glycerine[3] | 2.81 g |
| Surfactant[4] | 0.14 g |
| Biocide | 0.10 g |
| Blue dye | 1.00 g |
| Defoamer[5] | 0.20 g |
| Polyurethane[6] | 2.40 g |
| Total: | 95.39 g |

[1] A polyvinylalcohol from Air Products Company obtained as Vinol 205.
[2] A polyglycerol from Chemical Components Inc., obtained as RZN.
[3] Glycerin from P & G, Inc.
[4] A fluorosurfactant from DuPont de Nemours & Co. obtained as Zonyl FSP.
[5] From Versa Chemical Co. identified as a paraffinic oil-based material.
[6] Witcobond W-240 from Witco Chemical Co.

EXAMPLE 4

A polyvinyl alcohol coating solution containing polyurethane dispersion solution containing mica and polyurethane dispersion, Table IV, was prepared following a similar procedure as in Example 2, along with the addition of a water dispersed polyurethane. The formulation was mixed for 10 minutes after addition of all of the ingredients.

TABLE IV

| Material | Amount |
| --- | --- |
| Deionized water | 71.00 g |
| PVA[1] | 12.22 g |
| Polyglycerol[2] | 0.28 g |
| Glycerine[3] | 2.81 g |
| Surfactant[4] | 0.14 g |
| Biocide | 0.10 g |
| Blue dye | 1.00 g |
| Defoamer[5] | 0.20 g |
| Mica (325 mesh) | 5.24 g |
| Polyurethane[6] | 2.40 g |
| Total: | 95.39 g |

[1] A polyvinylalcohol from Air Products Company obtained as Vinol 205.
[2] A polyglycerol from Chemical Components Inc., obtained as RZN.
[3] Glycerin from P & G, Inc.
[4] A fluorosurfactant from DuPont de Nemours & Co. obtained as Zonyl FSP.
[5] From Versa Chemical Co. identified as a paraffinic oil-based material.
[6] Witcobond W-240 from Witco Chemical Co.

The results of the humidity resistance test and the staining test are set forth in Table V.

TABLE V

| Sample # | 1 | 2 | 3 | 4 |
| --- | --- | --- | --- | --- |
| Test | | | | |
| 30° C. 90% RH (2-3 mil) | F | F | P | P |
| 70° C. 90% RH (2-3 mil) | F | F | P | P |
| Stain Resistance | F | P | F | P |

As apparent from Table V, utilization of a dispersed polyurethane resulted in improved humidity resistance and that the utilization of the barrier agent such as mica resulted in good stain resistance.

While in accordance with the Patent Statutes, the best mode and preferred embodiment has been set forth, the scope of the invention is not limited thereto, but rather by the scope of the attached claims.

We claim:

1. A humidity resistant rubber laminate, comprising:
   a rubber substrate; and
   a coating composition blend comprising;
   polyvinyl alcohol, a plasticizer that effectively plasticizes polyvinyl alcohol, and an effective amount of a water dispersible polyurethane to provide increased humidity resistance to said coating composition, wherein said effective amount of polyurethane is from about 2 to less than 20 parts by weight per 100 parts by weight of said polyvinyl alcohol.

2. A humidity resistant rubber laminate according to claim 1, wherein said polyurethane is substantially blocked.

3. A humidity resistant rubber laminate according to claim 2, wherein said polyvinyl alcohol has a weight average molecular weight of from about 22,000 to about 250,000, wherein said blocked polyurethane is made from a polyisocyanate and a hydroxyl terminated intermediate, and wherein said intermediate has a molecular weight of from about 700 to about 25,000.

4. A humidity resistant rubber laminate according to claim 3, wherein the amount of said blocked polyurethane is from about 3 parts by weight to less than 20 parts by weight per 100 parts by weight of said polyvinyl alcohol and wherein said hydroxyl terminated intermediate is a hydroxyl terminated polyester intermediate, and wherein said plasticizer is water soluble and wherein said plasticizer is glycerine, polyglycerol, or blends thereof.

5. A humidity resistant rubber laminate according to claim 4, wherein said blocked polyurethane has a molecular weight of from about 1,200 to about 5,000, wherein said polyester intermediate is made from both propylene glycol and adipic acid or phthalic acid, or combinations thereof.

6. A humidity resistant rubber laminate according to claim 1, and wherein said substrate is a whitewall area portion of the tire, and wherein the dry thickness of said coating composition blend is from about 1 to about 5 mils.

7. A humidity resistant rubber laminate according to claim 3, wherein said substrate is a whitewall area portion of the tire, and wherein the dry thickness of said coating composition blend is from about 1.5 to about 4.0 mils.

8. A humidity resistant rubber laminate according to claim 5, wherein said substrate is a whitewall area portion of the tire, and wherein the dry thickness of said coating composition blend is from about 1.5 to about 3 mils.

9. A humidity resistant rubber laminate according to claim 2, including from about 6 percent to about 100 parts by weight of a barrier agent per 100 parts by weight of said PVA.

10. A humidity resistant rubber laminate according to claim 5, including from about 30 to about 90 parts by weight of mica per 100 parts by weight of said PVA.

11. A humidity resistant rubber laminate, comprising:
    a rubber substrate; and
    a coating composition blend comprising;
    polyvinyl alcohol, a plasticizer that effectively plasticizes polyvinyl alcohol, and an effective amount of a water dispersible polyurethane to provide increased humidity resistance to said coating composition, wherein said effective amount of polyurethane is from about 2 to less than 30 parts by weight per 100 parts by weight of said polyvinyl alcohol, and one or more barrier agents wherein said barrier agents are present from about 15 to about 100 parts by weight per 100 parts by weight of said polyvinyl alcohol.

* * * * *